(12) United States Patent
Suzuki (10) Patent No.: US 7,126,304 B2
(45) Date of Patent: Oct. 24, 2006

(54) MOTOR CONTROLLER AND ELECTRIC POWER STEERING APPARATUS

(75) Inventor: Hiroshi Suzuki, Okazaki (JP)

(73) Assignees: Favess Co., Ltd., Okazaki (JP); Toyoda Koki Kabushiki Kaisha, Kariya (JP); Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 11/218,614

(22) Filed: Sep. 6, 2005

(65) Prior Publication Data

US 2006/0049784 A1    Mar. 9, 2006

(30) Foreign Application Priority Data

Sep. 8, 2004    (JP)    ............... 2004-260611

(51) Int. Cl.
*G05B 11/28*    (2006.01)
(52) U.S. Cl. ............ 318/599; 318/580; 318/811; 318/254
(58) Field of Classification Search ............ None
See application file for complete search history.

(56) References Cited

U.S. PATENT DOCUMENTS

| | | | | |
|---|---|---|---|---|
| 4,547,719 A | * | 10/1985 | Sakamoto et al. | 318/723 |
| 4,719,400 A | * | 1/1988 | Kurakake et al. | 318/811 |
| 4,751,447 A | * | 6/1988 | Okachi | 318/772 |
| 5,099,408 A | * | 3/1992 | Chen et al. | 363/41 |
| 5,253,155 A | * | 10/1993 | Yamamoto | 363/71 |
| 5,270,632 A | * | 12/1993 | Hirota et al. | 318/799 |
| 5,341,081 A | * | 8/1994 | Yamada | 318/800 |
| 5,450,306 A | * | 9/1995 | Garces et al. | 363/41 |
| 5,475,293 A | * | 12/1995 | Sakai et al. | 318/802 |
| 5,481,173 A | * | 1/1996 | Yamamoto | 318/801 |
| 5,550,450 A | * | 8/1996 | Palko et al. | 318/800 |
| 5,594,670 A | * | 1/1997 | Yamamoto | 702/64 |
| 5,616,999 A | * | 4/1997 | Matsumura et al. | 318/632 |
| 5,623,192 A | * | 4/1997 | Yamamoto | 318/811 |
| 5,625,264 A | * | 4/1997 | Yoon | 318/254 |
| 5,671,130 A | * | 9/1997 | Kerkman et al. | 363/41 |

(Continued)

FOREIGN PATENT DOCUMENTS

JP    2004-80954    3/2004

(Continued)

OTHER PUBLICATIONS

Hidehiko Sugimoto, "Facts of Theory and Design of AC Servo Motor Systems", Denshi Shuppansha, 6th edition, Aug. 2002, pp. 56-58. (with Partial English Translation).

*Primary Examiner*—Lincoln Donovan
*Assistant Examiner*—Robert W. Horn
(74) *Attorney, Agent, or Firm*—Oblon, Spivak, McClelland, Maier & Neustadt, P.C.

(57) ABSTRACT

A microcomputer includes a rotation angular velocity computation section, a feedback gain determination section, and a dead time compensation amount determination section. The rotation angular velocity determination section computes the rotation angular velocity of a brushless motor. Based on the rotation angular velocity, the feedback gain determination section determines feedback gains. The dead time compensation amount determination section determines a dead time compensation amount. The greater the absolute value of the rotation angular velocity, that is, the higher the rotation speed of the brushless motor, the greater the feedback gains determined by the feedback gain determination section become, and the higher the responsivity of the feedback gains becomes. The greater the absolute value of the rotation angular velocity, the smaller the dead time compensation amount determined by the dead time compensation amount determination section becomes.

14 Claims, 7 Drawing Sheets

U.S. PATENT DOCUMENTS

| | | | | |
|---|---|---|---|---|
| 5,764,024 A * | 6/1998 | Wilson | | 318/805 |
| 5,805,438 A * | 9/1998 | Takada et al. | | 363/98 |
| 5,811,949 A * | 9/1998 | Garces | | 318/448 |
| 5,850,132 A * | 12/1998 | Garces | | 318/559 |
| 5,852,554 A * | 12/1998 | Yamamoto | | 363/71 |
| 5,867,380 A * | 2/1999 | Lee | | 363/98 |
| 5,872,710 A * | 2/1999 | Kameyama | | 363/95 |
| 5,917,721 A * | 6/1999 | Kerkman et al. | | 363/98 |
| 5,930,132 A * | 7/1999 | Watanabe et al. | | 363/56.04 |
| 5,977,741 A * | 11/1999 | DeLange et al. | | 318/801 |
| 5,991,176 A * | 11/1999 | Saada et al. | | 363/58 |
| 6,021,058 A * | 2/2000 | Yasohara et al. | | 363/98 |
| 6,023,417 A * | 2/2000 | Hava et al. | | 363/41 |
| 6,307,336 B1 * | 10/2001 | Goff et al. | | 318/254 |
| 6,356,463 B1 * | 3/2002 | Tsai | | 363/17 |
| 6,362,593 B1 * | 3/2002 | Lee | | 318/801 |
| 6,448,724 B1 * | 9/2002 | Kleinau et al. | | 318/254 |
| 6,469,916 B1 * | 10/2002 | Kerkman et al. | | 363/41 |
| 6,477,067 B1 * | 11/2002 | Kerkman et al. | | 363/41 |
| 6,498,451 B1 * | 12/2002 | Boules et al. | | 318/661 |
| 6,501,243 B1 * | 12/2002 | Kaneko et al. | | 318/700 |
| 6,535,402 B1 * | 3/2003 | Ying et al. | | 363/41 |
| 6,535,406 B1 * | 3/2003 | Asaeda et al. | | 363/98 |
| 6,667,598 B1 * | 12/2003 | Shimohara | | 318/811 |
| 6,690,135 B1 * | 2/2004 | Mir et al. | | 318/599 |
| 6,690,593 B1 * | 2/2004 | Kimura et al. | | 363/98 |
| 6,714,424 B1 * | 3/2004 | Deng et al. | | 363/17 |
| 6,732,039 B1 * | 5/2004 | Ino et al. | | 701/93 |
| 6,775,158 B1 * | 8/2004 | Fu | | 363/41 |
| 6,798,161 B1 * | 9/2004 | Suzuki | | 318/434 |
| 6,819,070 B1 * | 11/2004 | Kerkman et al. | | 318/434 |
| 6,847,532 B1 * | 1/2005 | Villaret | | 363/132 |
| 6,883,637 B1 * | 4/2005 | Nishizaki et al. | | 180/446 |
| 6,909,620 B1 * | 6/2005 | Park et al. | | 363/56.04 |
| 6,914,399 B1 * | 7/2005 | Kushion et al. | | 318/434 |
| 6,928,357 B1 * | 8/2005 | Higashimata et al. | | 701/87 |
| 6,940,253 B1 * | 9/2005 | Hinkkanen | | 318/804 |
| 6,984,953 B1 * | 1/2006 | Quirion et al. | | 318/599 |
| 2003/0057003 A1 * | 3/2003 | Kawada et al. | | 180/65.1 |
| 2003/0090232 A1 * | 5/2003 | Ho | | 318/801 |
| 2003/0137269 A1 * | 7/2003 | Mir et al. | | 318/599 |
| 2004/0007999 A1 * | 1/2004 | Kushion et al. | | 318/442 |
| 2004/0027083 A1 * | 2/2004 | Suzuki | | 318/434 |
| 2004/0027760 A1 * | 2/2004 | Villaret | | 361/94 |
| 2004/0037097 A1 * | 2/2004 | Deng et al. | | 363/41 |
| 2004/0059489 A1 * | 3/2004 | Hanggi et al. | | 701/51 |
| 2004/0169482 A1 * | 9/2004 | Maeda | | 318/443 |
| 2004/0239280 A1 * | 12/2004 | Zhang et al. | | 318/609 |
| 2005/0001583 A1 * | 1/2005 | Hinkkanen | | 318/807 |
| 2005/0189891 A1 * | 9/2005 | Kurosawa et al. | | 318/254 |
| 2006/0006834 A1 * | 1/2006 | Suzuki | | 318/801 |
| 2006/0049784 A1 * | 3/2006 | Suzuki | | 318/139 |
| 2006/0083037 A1 * | 4/2006 | Leung et al. | | 363/98 |
| 2006/0103459 A1 * | 5/2006 | Ma | | 330/10 |
| 2006/0113937 A1 * | 6/2006 | Hidaka et al. | | 318/432 |

FOREIGN PATENT DOCUMENTS

JP    2004-201414    7/2004

* cited by examiner

MOTOR CONTROLLER AND ELECTRIC POWER STEERING APPARATUS

BACKGROUND OF THE INVENTION

The present invention relates to a motor controller and an electric power steering apparatus.

Conventionally, a type of a motor controller has been used which converts direct-current voltage supplied from a direct-current power supply to three-phase (U, V, W) drive power using a PWM (pulse-width modulation) inverter, and supplies the three-phase drive power to a brushless motor.

Figure 7:
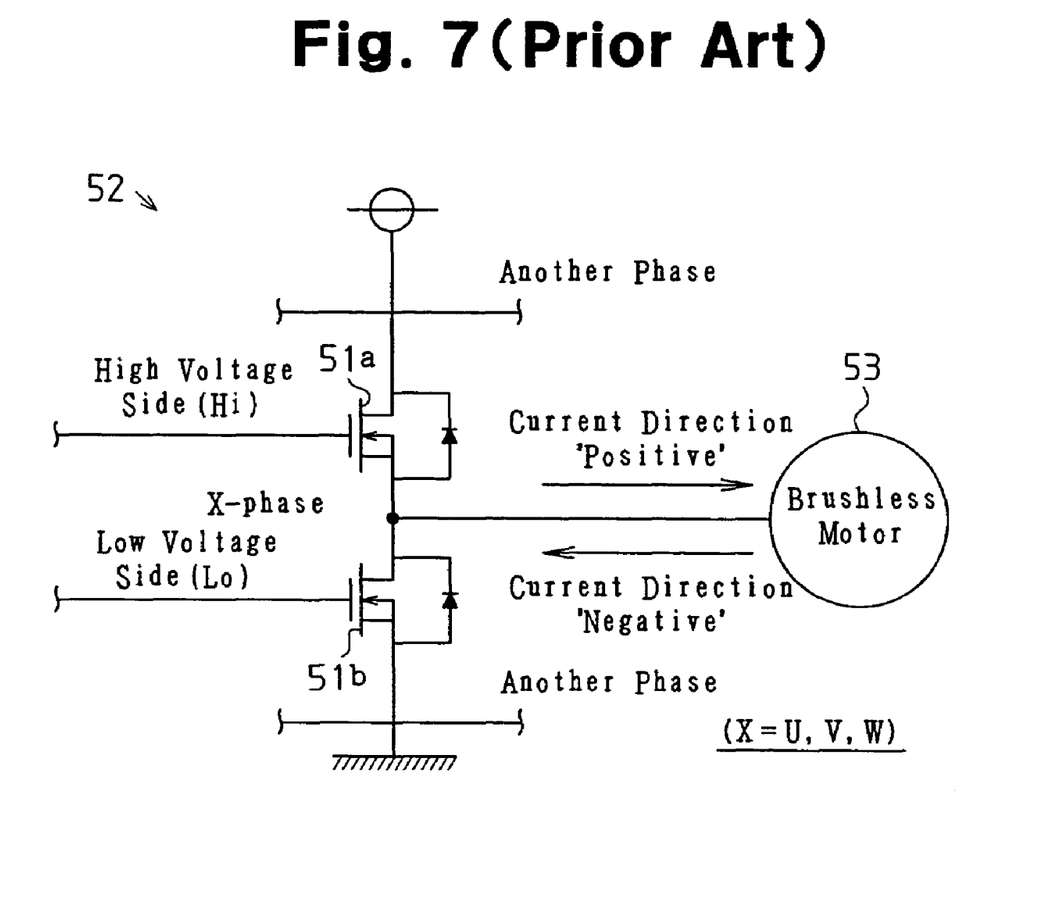
FIG. 7 is a diagram showing an arm forming a prior art PWM inverter.

As shown in FIG. 7, a PWM inventor is configured of three arms 52 in parallel as basic units. Each arm 52 corresponds to one of the phases and includes a pair of switching elements (for example, power MOSFETs) 51a, 51b in series. The motor controller alternately turns on and off the high voltage side switching element 51a and the low voltage side switching element 51b of each arm 52 at a predetermined timing, thereby supplying three-phase drive power to a brushless motor 53.

In such a motor controller, to prevent a short circuit (arm short circuit) between each high voltage side switching element 51a and the corresponding low voltage side switching element 51b, "dead time" is set when the switching elements 51a, 51b are turned on and off, in which "dead time" both switching elements 51a, 51b are off. However, the dead time causes errors to occur between a voltage command value and an output voltage of the PWM inverter. This in turn creates torque ripples, vibrations, and current distortion, which can cause sound noise.

In an electric power steering (EPS) apparatus, a motor, which is a driving source, is controlled through a feedback control based on a deviation of an actual current value from a current command value that is a control target of assisting force (assist torque). When the steering wheel is being turned slowly, that is, when the motor rotates slowly, the torque sensor is likely to pick up current noise. Particularly, during extreme steering, which causes a large current to pass through the PWM inverter, current noise is likely to be produced. Thus, rotation of the motor is influenced by current noise. Accordingly, unstable rotation of the motor significantly increases sound noise and vibration. Therefore, a feedback gain for low speed rotation of the motor is generally set to a small value. As a result, when the motor is rotating at a low speed, the influence of current distortion, which accompanies dead time described above, is likely to appear.

Accordingly, in conventional motor controls including motor controls used in EPS apparatuses, dead time compensation is performed to reduce errors between a voltage command value and an output voltage to suppress the occurrence of current distortion accompanying dead time.

Figure 8:
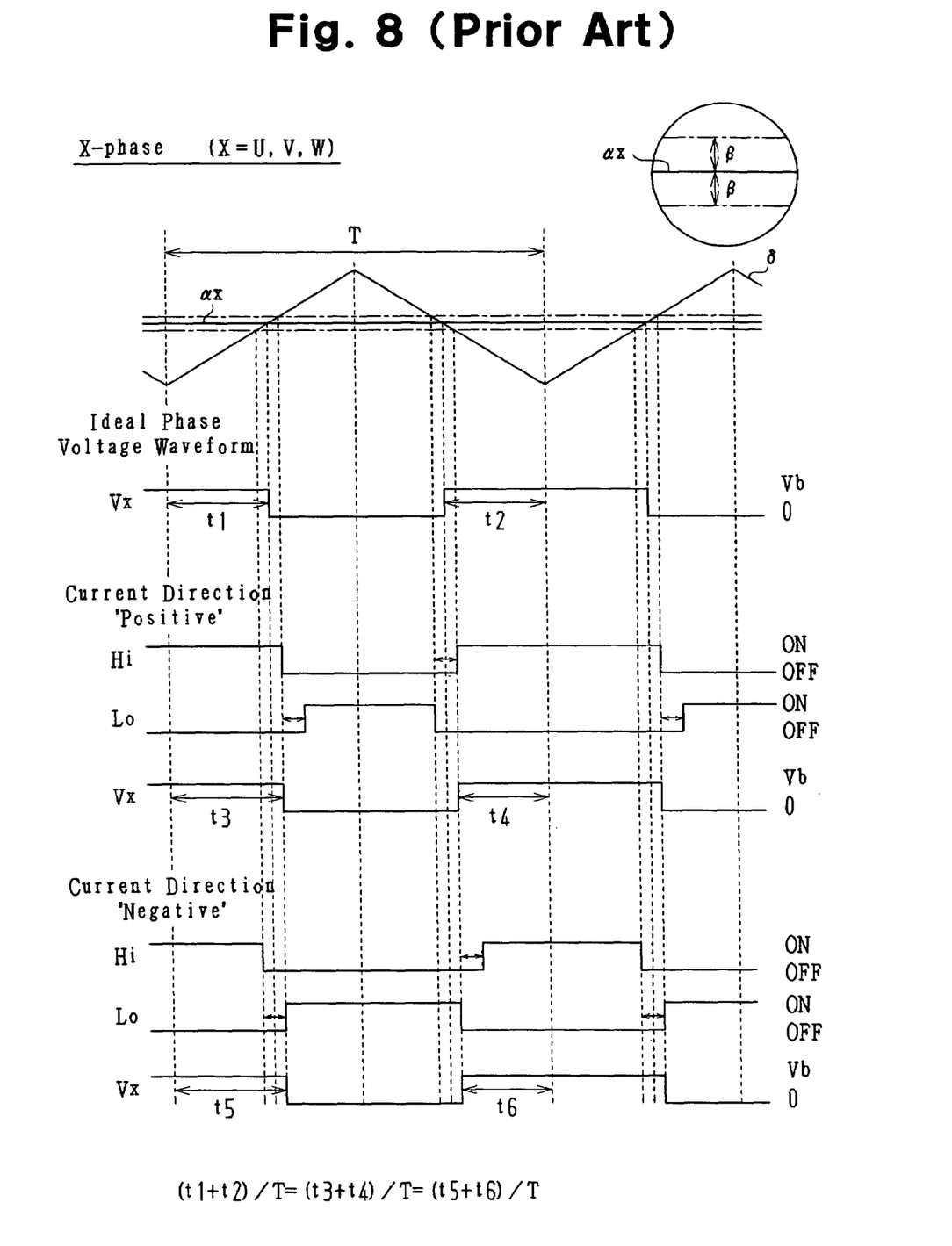
FIG. 8 is a waveform chart for explaining the operation of prior art compensation.

For example, as shown in FIG. 8, a method has been proposed in which a dead time compensation amount $\beta$ is added to or subtracted from a DUTY instruction value $\alpha x$. The DUTY instruction value $\alpha x$ is compared with a triangular wave $\delta$, which is a carrier wave, to determine the time of turning on and off the switching elements 51a, 51b. The dead time compensation amount $\beta$ is set in advance according to the direction of current of the DUTY instruction value $\alpha x$. See Hidehiko Sugimoto, *Facts of Theory and Design of AC Servo Motor Systems*, 6th edition, Denshi Shuppansha, August 2002, pp. 56–58.

More specifically, when the direction of a current of X-phase (X=U, V, W, the same applies hereinafter) that corresponds to one of the arms 52 is toward the brushless motor 53 from the arm 52, that is, when the direction of current is "positive" (see FIG. 7), the dead time compensation amount $\beta$ is added to the DUTY instruction value $\alpha x$. When the direction of current is toward the arm 52 from the brushless motor 53, that is, when the direction of current is "negative" (see FIG. 7), the dead time compensation amount $\beta$ is subtracted from the DUTY instruction value $\alpha x$. This equalizes a time in which the X-phase output voltage Vx becomes the power supply voltage Vb (t3+t4 or t5+t6) in a cycle T of the triangular wave $\delta$ with the corresponding time (t1+t2) in a case where no dead time is set (ideal voltage waveform). Thus, the voltage command value is caused to match the output voltage of the PWM inventor, so that current distortion due to dead time is prevented.

In recent years, software servo control performed by a microcomputer is most commonly used for controlling motors in steering systems. In software servo control, the output (renewal) of gate ON/OFF signals for performing a motor control that includes the above described dead time compensation, that is, the output (renewal) of gate ON/OFF signals for turning on and off switching elements of a PWM inverter, is performed in an interrupting manner at every predetermined cycle. That is, as the rotational speed of the motor is increased, the number of rotation of the motor per one output (renewal) of the gate ON/OFF signal is increased, that is, the motor control is made rougher.

Therefore, until the gate ON/OFF signal is renewed, a current zero cross point, which is the time at which the dead time compensation is switched, is displaced. That is, the switching time in the control and the actual switching time are deviated from each other. As a result, the dead time compensation amount $\beta$, which should be added to the DUTY instruction value $\alpha x$, is subtracted from the DUTY instruction value $\alpha x$ in some cases. In other cases, the dead time compensation amount $\beta$, which should be subtracted from the DUTY instruction value $\alpha x$, is added to the DUTY instruction value $\alpha x$ in other cases. In either case, current distortion is increased.

SUMMARY OF THE INVENTION

Accordingly, it is an objective of the present invention to provide a motor controller and an electric power steering apparatus that, irrespective of the rotational speed of the motor, accurately compensate for current distortion due to dead time.

To achieve the foregoing and other objectives and in accordance with the purpose of the present invention, a motor controller including a DUTY instruction value generation section, a PWM output section, and a PWM inverter is provided. The DUTY instruction value generation section generates a DUTY instruction value through a feedback control based on a deviation of an actual current value from a current command value. The PWM output section outputs a gate ON/OFF signal according to comparison between the DUTY instruction value and a carrier wave. The PWM inverter is formed of a plurality of switching element circuits connected in parallel. Each switching element circuit is formed of a pair of switching elements connected in series. When each switching element is turned on and off based on the gate ON/OFF signal, the PWM inverter converts a direct-current power supply to three-phase drive power, and supplies the three-phase drive power to a brushless motor. Dead time is set to prevent arm short circuits due to ON/OFF switching of each switching element. The gate ON/OFF signal is renewed at every predetermined cycle. The motor controller, further includes a current direction determination section, a rotation angular velocity computation section, a compensation amount determination section, a dead time compensation section, and a gain determination section. The current direction determination section determines the direction of current of each phase. The rotation angular velocity computation section computes a rotation angular velocity of the brushless motor. The compensation amount determination section determines a compensation amount for correcting the DUTY instruction value based on the rotation angular velocity. The greater the absolute value of the rotation angular velocity, the smaller the compensation amount determined by the compensation amount determination section becomes. The dead time compensation section selectively adds the compensation amount to and subtracts the compensation amount from the DUTY instruction value according to the current direction of each phase. The gain determination section determines a feedback gain of the feedback control based on the rotation angular velocity. The gain determination section changes the feedback gain such that the greater the absolute value of the rotation angular velocity, the higher the responsivity of the feedback control becomes.

The present invention provides another motor controller comprising a DUTY instruction value generation section, a PWM output section, and a PWM inverter. The DUTY instruction value generation section generates a DUTY instruction value through a feedback control based on a deviation of an actual current value from a current command value. The PWM output section outputs a gate ON/OFF signal according to comparison between the DUTY instruction value and a carrier wave. The PWM inverter is formed of a plurality of switching element circuits connected in parallel. Each switching element circuit is formed of a pair of switching elements connected in series. When each switching element is turned on and off based on the gate ON/OFF signal, the PWM inverter converts a direct-current power supply to three-phase drive power, and supplies the three-phase drive power to a brushless motor. Dead time is set to prevent arm short circuits due to ON/OFF switching of each switching element. The gate ON/OFF signal is renewed at every predetermined cycle. The motor controller further includes a current direction determination section, a rotation angular velocity computation section, a compensation amount determination section, a dead time compensation section, and a gain determination section. The current direction determination section determines the direction of current of each phase. The rotation angular velocity computation section computes a rotation angular velocity of the brushless motor. The compensation amount determination section determines a compensation amount for correcting the DUTY instruction value based on the rotation angular velocity. The greater the absolute value of the rotation angular velocity, the smaller the compensation amount determined by the compensation amount determination section become. The dead time compensation section selectively adds the compensation amount to and subtracts the compensation amount from the DUTY instruction value according to the current direction of each phase. The gain determination section determines a feedback gain of the feedback control based on the rotation angular velocity. The greater the absolute value of the rotation angular velocity, the greater the value of the feedback gain determined by the gain determination section becomes.

Further, the present invention provides a motor controller including a DUTY instruction value generation section, a PWM output section, and a PWM inverter. The DUTY instruction value generation section generates a DUTY instruction value through a feedback control based on a deviation of an actual current value from a current command value. The PWM output section outputs a gate ON/OFF signal according to comparison between the DUTY instruction value and a carrier wave. The PWM inverter is formed of a plurality of switching element circuits connected in parallel. Each switching element circuit is formed of a pair of switching elements connected in series. When each switching element is turned on and off based on the gate ON/OFF signal, the PWM inverter converts a direct-current power supply to three-phase drive power, and supplies the three-phase drive power to a brushless motor. Dead time is set to prevent arm short circuits due to ON/OFF switching of each switching element. The gate ON/OFF signal is renewed at every predetermined cycle. The motor controller further includes a current direction determination section, a rotation angular velocity computation section, a compensation amount determination section, a dead time compensation section, and a gain determination section. The current direction determination section determines the direction of current of each phase. The rotation angular velocity computation section computes a rotation angular velocity of the brushless motor. The compensation amount determination section determines a compensation amount for correcting the DUTY instruction value based on the rotation angular velocity. When the absolute value of the rotation angular velocity is greater than a predetermined value, the compensation amount determination section determines the compensation amount such that the compensation amount is smaller than the compensation amount in a case where the absolute value of the rotational angular velocity is less than the predetermined value. The dead time compensation section selectively adds the compensation amount to and subtracts the compensation amount from the DUTY instruction value according to the current direction of each phase. The gain determination section determines a feedback gain of the feedback control based on the rotation angular velocity. The greater the absolute value of the rotation angular velocity, the greater the value of the feedback gain determined by the gain determination section becomes.

In another aspect of the present invention, an electric power steering apparatus having a motor controller is provided. The motor controller includes a DUTY instruction value generation section, a PWM output section, a PWM inverter, a current direction determination section, a rotation angular velocity computation section, a compensation amount determination section, a dead time compensation section, and a gain determination section. The DUTY instruction value generation section generates a DUTY instruction value through a feedback control based on a deviation of an actual current value from a current command value. The PWM output section outputs a gate ON/OFF signal according to comparison between the DUTY instruction value and a carrier wave. The PWM inverter is formed of a plurality of switching element circuits connected in parallel. Each switching element circuit is formed of a pair of switching elements connected in series. When each switching element is turned on and off based on the gate ON/OFF signal, the PWM inverter converts a direct-current power supply to three-phase drive power, and supplies the three-phase drive power to a brushless motor. Dead time is set to prevent arm short circuits due to ON/OFF switching of each switching element. The gate ON/OFF signal is renewed at every predetermined cycle. The current direction determination section determines the direction of current of each phase. The rotation angular velocity computation section computes a rotation angular velocity of the brushless motor. The compensation amount determination section determines a compensation amount for correcting the DUTY instruction value based on the rotation angular velocity. The greater the absolute value of the rotation angular velocity, the smaller the compensation amount determined by the compensation amount determination section become. The dead time compensation section selectively adds the compensation amount to and subtracts the compensation amount from the DUTY instruction value according to the current direction of each phase. The gain determination section determines a feedback gain of the feedback control based on the rotation angular velocity. The gain determination section changes the feedback gain such that the greater the absolute value of the rotation angular velocity, the higher the responsivity of the feedback control becomes.

The present invention provides another electric power steering apparatus having a motor controller. The motor controller includes a DUTY instruction value generation section, a PWM output section, a PWM inverter, a current direction determination section, a rotation angular velocity computation section, a compensation amount determination section, a dead time compensation section, a gain determination section. The DUTY instruction value generation section generates a DUTY instruction value through a feedback control based on a deviation of an actual current value from a current command value. The PWM output section outputs a gate ON/OFF signal according to comparison between the DUTY instruction value and a carrier wave. The PWM inverter is formed of a plurality of switching element circuits connected in parallel. Each switching element circuit is formed of a pair of switching elements connected in series. When each switching element is turned on and off based on the gate ON/OFF signal, the PWM inverter converts a direct-current power supply to three-phase drive power, and supplies the three-phase drive power to a brushless motor. Dead time is set to prevent arm short circuits due to ON/OFF switching of each switching element. The gate ON/OFF signal is renewed at every predetermined cycle. The current direction determination section determines the direction of current of each phase. The rotation angular velocity computation section computes a rotation angular velocity of the brushless motor. The compensation amount determination section determines a compensation amount for correcting the DUTY instruction value based on the rotation angular velocity. The greater the absolute value of the rotation angular velocity, the smaller the compensation amount determined by the compensation amount determination section become. The dead time compensation section selectively adds the compensation amount to and subtracts the compensation amount from the DUTY instruction value according to the current direction of each phase. The gain determination section determines a feedback gain of the feedback control based on the rotation angular velocity. The greater the absolute value of the rotation angular velocity, the greater the value of the feedback gain determined by the gain determination section becomes.

Further, the present invention provides another an electric power steering apparatus having a motor controller. The motor controller includes a DUTY instruction value generation section, a PWM output section, a PWM inverter, a current direction determination section, a rotation angular velocity computation section, a compensation amount determination section, a dead time compensation section, and a gain determination section. The DUTY instruction value generation section generates a DUTY instruction value through a feedback control based on a deviation of an actual current value from a current command value. The PWM output section outputs a gate ON/OFF signal according to comparison between the DUTY instruction value and a carrier wave. The PWM inverter is formed of a plurality of switching element circuits connected in parallel. Each switching element circuit is formed of a pair of switching elements connected in series. When each switching element is turned on and off based on the gate ON/OFF signal, the PWM inverter converts a direct-current power supply to three-phase drive power, and supplies the three-phase drive power to a brushless motor. Dead time is set to prevent arm short circuits due to ON/OFF switching of each switching element. The gate ON/OFF signal is renewed at every predetermined cycle. The current direction determination section determines the direction of current of each phase. The rotation angular velocity computation section computes a rotation angular velocity of the brushless motor. The compensation amount determination section determines a compensation amount for correcting the DUTY instruction value based on the rotation angular velocity. When the absolute value of the rotation angular velocity is greater than a predetermined value, the compensation amount determination section determines the compensation amount such that the compensation amount is smaller than the compensation amount in a case where the absolute value of the rotational angular velocity is less than the predetermined value. The dead time compensation section that selectively adds the compensation amount to and subtracts the compensation amount from the DUTY instruction value according to the current direction of each phase. The gain determination section determines a feedback gain of the feedback control based on the rotation angular velocity. The greater the absolute value of the rotation angular velocity, the greater the value of the feedback gain determined by the gain determination section becomes.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, an electric power steering (EPS) apparatus according to a preferred embodiment of the present invention will be described with reference to the drawings.

Figure 1:
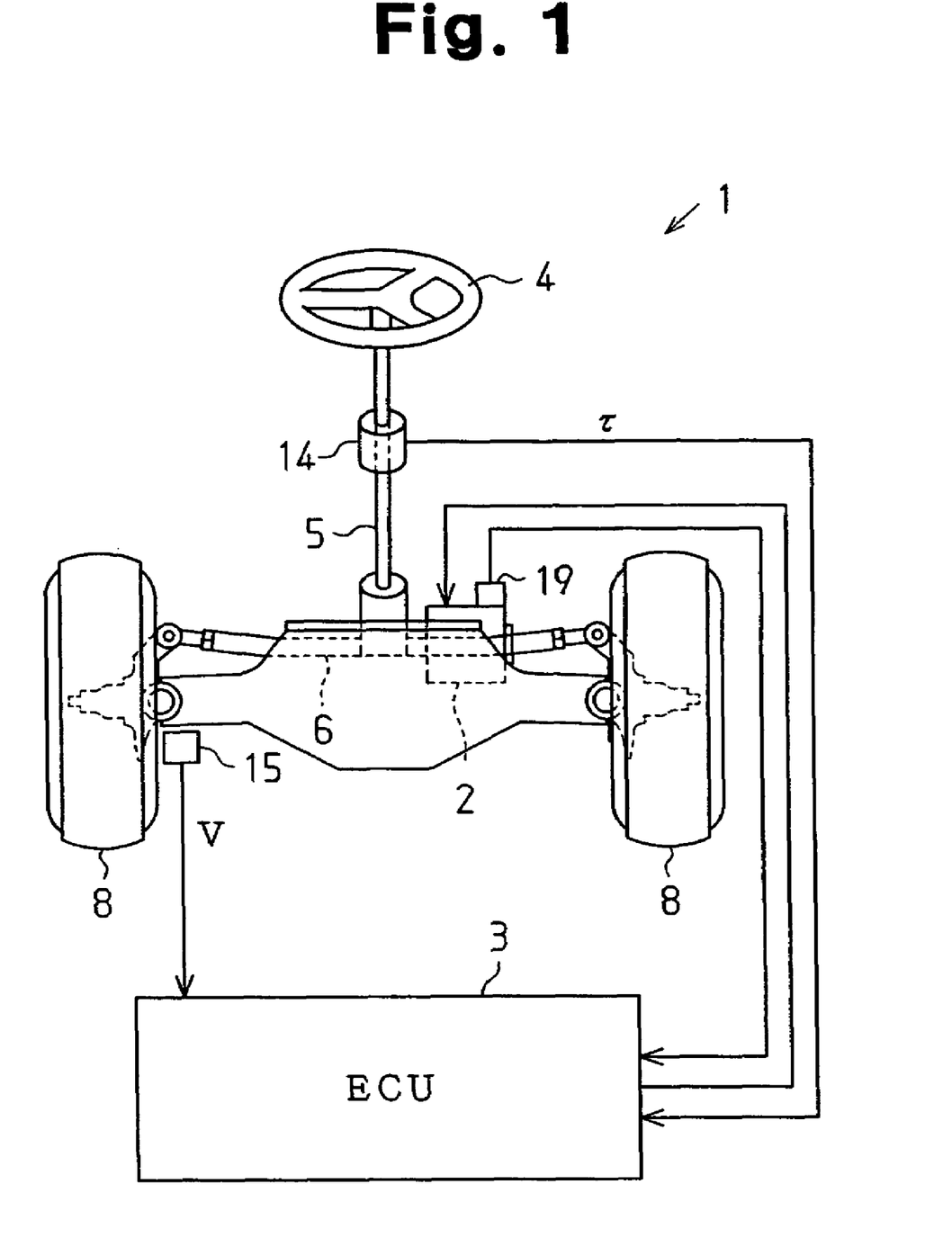
FIG. 1 is a view illustrating an EPS apparatus according to a preferred embodiment of the present invention.

As shown in FIG. 1, the EPS apparatus 1 includes a brushless motor 2 and an ECU 3. The brushless motor 2 functions as a driving source that applies assisting force to the steering system of a vehicle. The ECU 3 functions as a motor controller that controls the brushless motor 2.

A steering wheel 4 is coupled to a rack 6 with a steering shaft 5. Rotation of the steering shaft 5 caused by steering operation is converted into linear reciprocation of the rack 6 by means of a rack-and-pinion mechanism (not shown) and is transmitted to steered wheels 8. The EPS apparatus 1 according to this embodiment is a rack type EPS apparatus, in which the brushless motor 2 is arranged coaxial with the rack 6. Assist torque generated by the brushless motor 2 is transmitted to the rack 6 through a ball screw mechanism (not shown). The ECU 3 controls assisting force applied to the steering system by controlling the assist torque generated by the motor 2.

Figure 2:
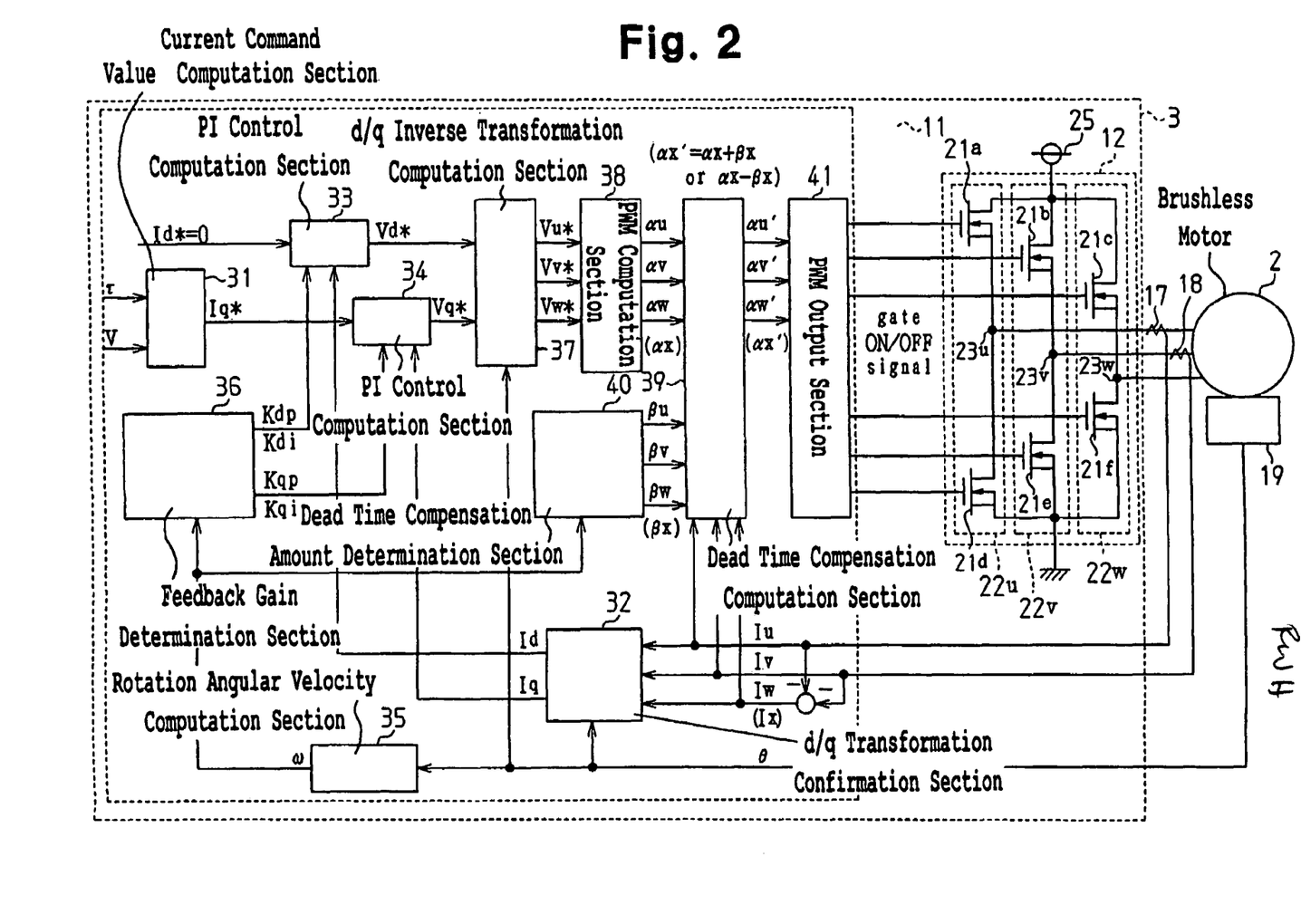
FIG. 2 is a block diagram showing the configuration of the ECU.
Figure 3A:
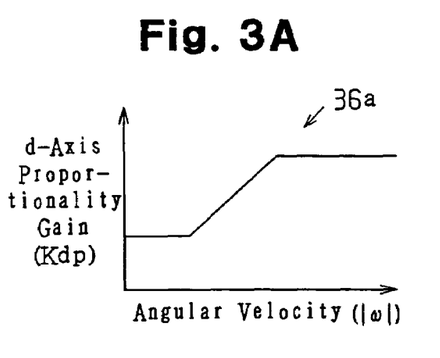
FIGS. 3A to 3D are diagrams showing gain maps.
Figure 3B:
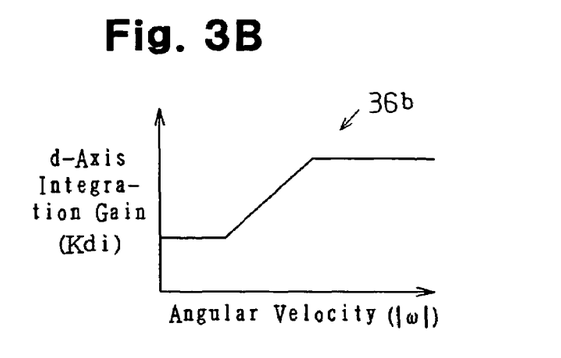
Figure 3C:
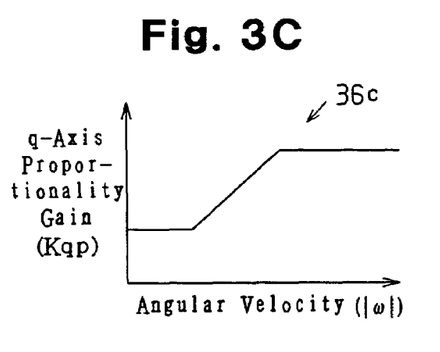
Figure 3D:
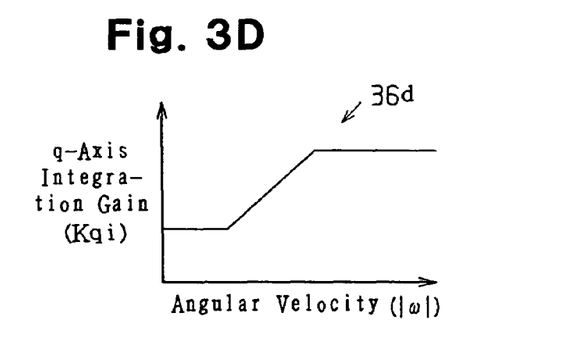

As shown in FIG. 2, the ECU 3 includes a microcomputer 11 and a PWM inverter 12. The microcomputer 11 outputs gate ON/OFF signals. The PWM inverter 12 supplies three-phase (U, V, W) drive power to the brushless motor 2 based on the gate ON/OFF signals.

The ECU 3 according to this embodiment is connected to a torque sensor 14 for detecting steering torque τ and a vehicle speed sensor 15 (see FIG. 1) for detecting a vehicle speed V. Based on the inputted steering torque τ and the vehicle speed V, the microcomputer 11 determines assisting force to be applied to the steering system, that is, assist torque to be generated by the motor 2. The microcomputer 11 is also connected to two current sensors 17, 18, and a rotation angle sensor 19. The current sensors 17, 18 detect values of current supplied to the brushless motor 2. The rotation angle sensor 19 detects the rotation angle (electrical angle) θ of the brushless motor 2. Based on the output signals of these sensors, the microcomputer 11 detects phase current values Iu, Iv, Iw, and the rotation angle θ of the brushless motor 2. Based on the detected phase current values Iu, Iv, Iw and the rotation angle θ, the microcomputer 11 outputs a gate ON/OFF signal for causing the motor 2 to generate the determined assist torque.

On the other hand, the PWM inverter 12 is formed of a plurality (in this embodiment, 2×3) of power MOSFETs (hereinafter, simply referred to as FETs), each of which corresponds to one of the phases of the brushless motor 2. More specifically, the PWM inverter 12 is formed by connecting three arms 22u, 22v, 22w in parallel. The arm 22u is a series circuit of FETs 21a, 21d, and a node 23u of the FETs 21a, 21d is connected to a U phase coil of the brushless motor 2. The arm 22v is a series circuit of FETs 21b, 21e, and a node 23v of the FETs 21b, 21e is connected to a V phase coil of the brushless motor 2. The arm 22w is a series circuit of FETs 21c, 21f, and a node 23w of the FETs 21c, 21f is connected to a W phase coil of the brushless motor 2.

The gate ON/OFF signals outputted by the microcomputer 11 are applied to the gate terminals of the FETs 21a to 21f. In response to the gate ON/OFF signals, the FETs 21a to 21f are turned on and off. This converts direct current voltage from the direct-current power supply 25 into drive power of each phase, which is in turn supplied to the brushless motor 2.

(Motor Control and Dead Time Compensation)

Operations of the motor control and the dead time compensation of the present embodiment will now be described.

In this embodiment, the microcomputer 11 maps the phase current values Iu, Iv, Iw to a d/q coordinate system (d/q transformation), thereby performing a current feedback control on the d/q coordinate system. Further, the microcomputer 11 generates DUTY instruction values that determine the time of turning on and off of the FETs 21a to 21f forming the PWM inverter 12, and outputs the gate ON/OFF signals based on the DUTY instruction values.

Specifically, the steering torque τ detected by the torque sensor 14 and the vehicle speed V detected by the vehicle speed sensor 15 are sent to a current command value computation section 31. Based on the inputted steering torque τ and vehicle speed V, the current command value computation section 31 computes a q-axis current command value Iq*, which is a control target of the assist torque. The phase current values Iu, Iv, Iw detected by the current sensors 17, 18, and the rotation angle θ detected by the rotation angle sensor 19 are sent to a d/q transformation computation section 32. Based on the inputted rotation angle θ, the d/q transformation computation section 32 transforms the phase current values Iu, Iv, Iw into a d-axis current value Id and a q-axis current value Iq on the d/q coordinate system.

The q-axis current command value Iq* computed by the current command value computation section 31, and the d-axis current value Id and the q-axis current value Iq computed by the d/q transformation computation section 32 are sent to PI control computation sections 33, 34, each corresponding to one axis of the d/q coordinate system, respectively. In this embodiment, the PI control computation section 33, which corresponds to the d-axis, receives zero as a d-axis current command value Id* (Id*=0). The PI control computation section 33 performs feedback control (proportionality and integration control) based on the deviation of the d-axis current value Id from the d-axis current command value Id*, thereby computing a d-axis voltage command value Vd*. Likewise, the PI control computation section 34, which corresponds to the q-axis, computes a q-axis voltage command value Vq* based on the deviation of the q-axis current value Iq from the q-axis current command value Iq*.

The microcomputer 11 according to this embodiment includes a rotation angular velocity computation section 35 and a feedback gain determination section 36. The rotation angular velocity computation section 35 functions as a rotation angular velocity computation section that computes the rotation angular velocity ω of the brushless motor 2 based on the rotation angle θ. The feedback gain determination section 36 functions as a gain determination section that determines a feedback gain used in the feedback control based on the rotation angular velocity ω.

The feedback gain determination section 36 according to this embodiment determines, as the feedback gains, a d-axis proportionality gain Kdp and a d-axis integration gain Kdi, and a q-axis proportionality gain Kqp and a q-axis integration gain Kqi. More specifically, the feedback gain determination section 36 has gain maps 36a to 36d, in which the absolute value of the rotation angular velocity ω is related to the feedback gains Kdp, Kdi, Kqp, Kqi (see FIGS. 3A to 3D). In each of the gain maps 36a to 36d, the feedback gain increases as the absolute value of the rotation angular velocity ω increases. Based on the gain maps 36a to 36d, the feedback gain determination section 36 determines feedback gains that correspond to the rotation angular velocity A), that is, determines the values of the d-axis proportionality gain Kdp, the d-axis integration gain Kdi, the q-axis proportionality gain Kqp and the q-axis integration gain Kqi.

In this embodiment, the greater the absolute value of the rotation angular velocity ω, that is, the higher the rotation speed of the brushless motor 2, the greater the feedback gains determined by the feedback gain determination section 36 become, and the higher the responsivity of the feedback gains becomes. The PI control computation sections 33, 34 perform the feedback control based on the feedback gains determined by the feedback gain determination section 36.

The d-axis voltage command value Vd* and the q-axis voltage command value Vq* computed by the PI control computation sections 33, 34 are sent to a d/q inverse transformation computation section 37 together with the rotation angle θ. Based on the inputted rotation angle θ, the d/q inverse transformation computation section 37 transforms the d-axis voltage command value Vd* and the q-axis voltage command value Vq* to three phase voltage command values Vu*, Vv*, Vw*, and sends the voltage command value Vu*, Vv*, Vw* to a PWM computation section 38. Based on the phase voltage command values Vu*, Vv*, Vw*, the PWM computation section 38 generates DUTY instruction values αu, αv, αw of each of the phases. That is, in this embodiment, the d/q transformation computation section 32, the PI control computation sections 33, 34, the d/q inverse transformation computation section 37, and the PWM computation section 38 form a DUTY instruction value generation section.

The microcomputer 11 according to this embodiment includes a dead time compensation computation section 39 and a dead time compensation amount determination section 40 for correcting the DUTY instruction values αu, αv, αw of each of the phases to compensate for current distortion due to dead time. The dead time compensation computation section 39 functions as a determination section and a dead time compensation section. The dead time compensation amount determination section 40 functions as a compensation amount determination section that determines the compensation amount of dead time. The DUTY instruction values αu', αv', αw' corrected by the dead time compensation computation section 39 are sent to a PWM output section 41.

Figure 4A:
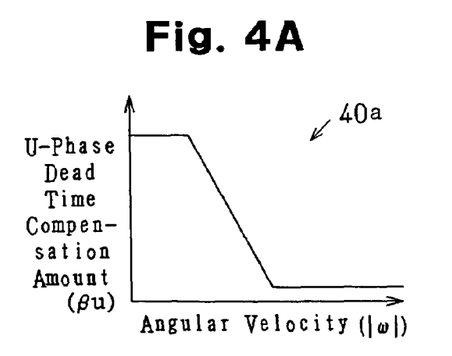
FIGS. 4A to 4C are diagrams showing compensation amount maps.
Figure 4B:
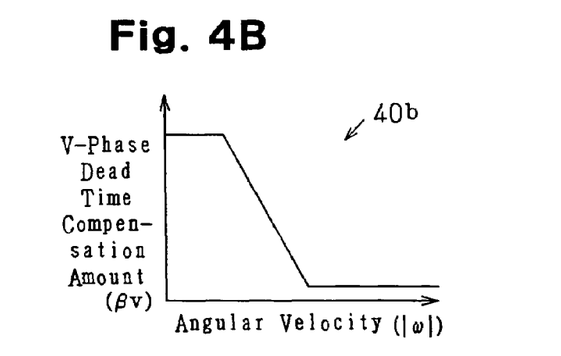
Figure 4C:
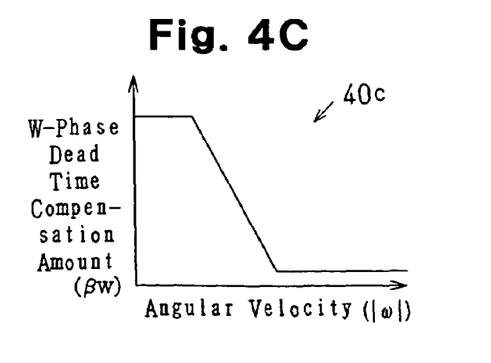

Specifically, the dead time compensation amount determination section 40 has compensation amount maps 40a to 40c, in which dead time compensation amounts βu, βv, βw of each of the phases are related to the absolute value of the rotation angular velocity ω (see FIGS. 4(a) to 4(c)). In each of the compensation amount maps 40a to 40c, each of the dead time compensation amounts βu, βv, βw decreases as the absolute value of the rotation angular velocity ω increases. Based on the compensation amount maps 40a to 40c, the dead time compensation amount determination section 40 determines the values of the dead time compensation amount βu, βv, βw that correspond to the rotation angular velocity ω.

In this embodiment, the greater the absolute value of the rotation angular velocity ω, that is, the higher the rotation speed of the brushless motor 2, the smaller the dead time compensation amount βu, βv, βw determined by the dead time compensation amount determination section 40 become. The dead time compensation computation section 39 corrects the DUTY instruction values αu, αv, αw of each of the phases based on the dead time compensation amounts βu, βv, βw determined by the dead time compensation amount determination section 40.

Together with the DUTY instruction value αx for each phase and the dead time compensation amount αx, the dead time compensation computation section 39 receives phase current value Ix. The dead time compensation computation section 39 determines the direction of current of each phase based on the phase current values Ix. According to the direction of current of each phase, the dead time compensation computation section 39 adds or subtracts the dead time compensation amount βx to or from the DUTY instruction value αx, thereby correcting the DUTY instruction value αx.

Figure 5:
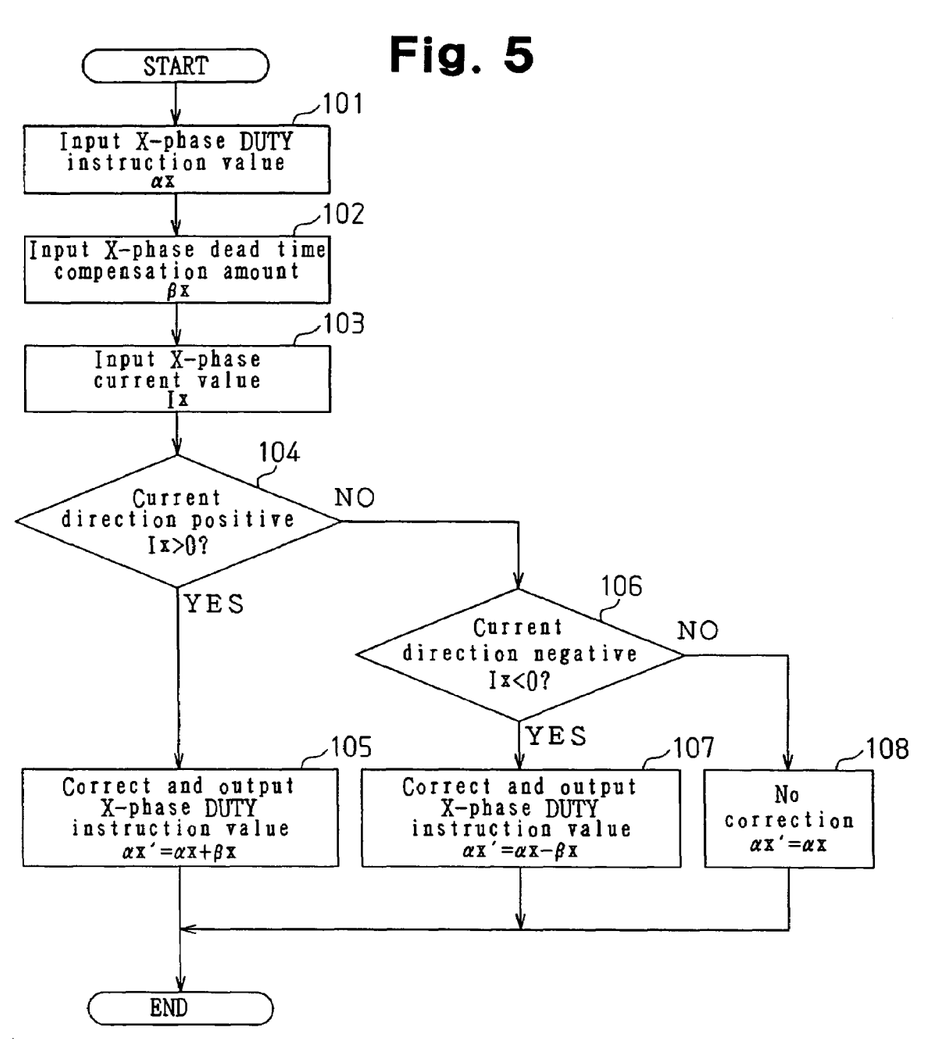
FIG. 5 is a flowchart showing a procedure of a dead time compensation computation.

That is, as shown in the flowchart of FIG. 5, when receiving the DUTY instruction value αx of the X phase (step 101), the dead time compensation amount βx (step 102), and the phase current value Ix of the X phase (step 103), the dead time compensation computation section 39 first determines whether the direction of current of the X phase is positive (step 104). When determining that the current direction of the X phase is positive (Ix>0, step 104: YES), the microcomputer 11 adds the dead time compensation amount βx received at step 102 to the X-phase DUTY instruction value αx, thereby correcting the DUTY instruction value αx, and sends the corrected DUTY instruction value αx' to the PWM output section 41 (αx'=αx+βx, step 105).

On the other hand, when determining that the current direction of the X phase is not positive at step 104 (step 104: NO), the microcomputer 11 determines whether the current direction of the X phase is negative (step 106). When determining that the current direction of the X phase is negative (Ix<0, step 106: YES), the microcomputer 11 subtracts the dead time compensation amount βx received at step 102 from the X-phase DUTY instruction value αx, thereby correcting the DUTY instruction value αx, and sends the corrected DUTY instruction value αx' to the PWM output section 41 (αx'=αx−βx, step 107).

At step 106, when determining that the current direction of the X phase is not negative (step 106: NO), that is, when the phase current value of the X phase is 0, the dead time compensation computation section 39 does not correct the DUTY instruction value αx received at step 101 (αx'=αx, step 108).

In this manner, the dead time compensation computation section 39 executes steps 101 to 108 for each phase, thereby correcting the DUTY instruction values αu, αv, αw of the U, V, and W phases, and sends the corrected DUTY instruction values αu', αv', αw' to the PWM output section 41. Then, based on the comparison between the DUTY instruction values αu', αv', αw' corrected by the dead time compensation computation section 39 and the triangular wave δ, which is a carrier wave, the PWM output section 41 generates the gate ON/OFF signal (see FIG. 8), and sends the gate ON/OFF signal to the PWM inverter 12.

The procedure of the motor control performed by the microcomputer 11 according to this embodiment will now be described.

Figure 6:
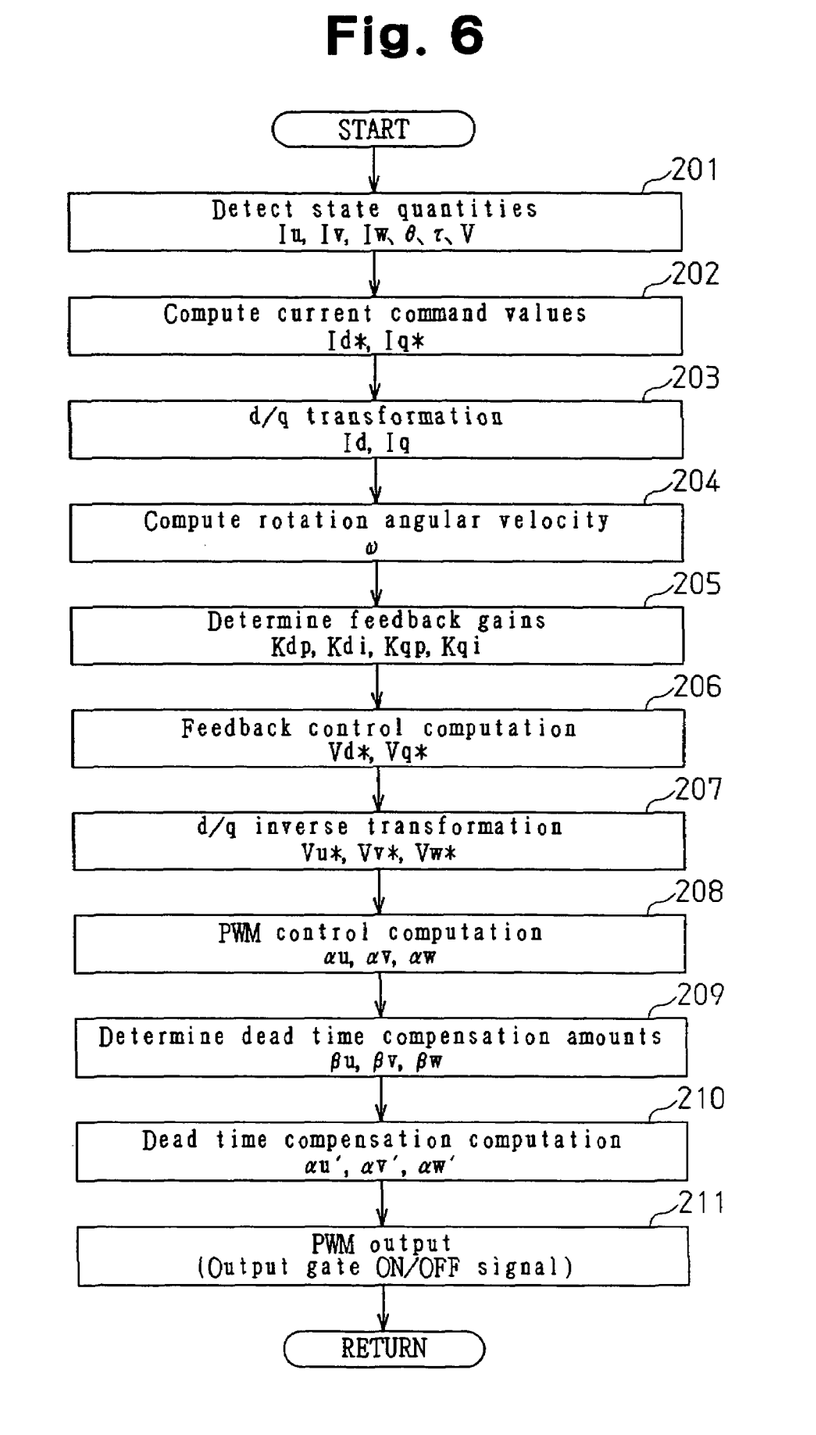
FIG. 6 is a flowchart showing a procedure of a motor control.

The microcomputer 11 according to this embodiment executes steps 201 to 211 shown in the flowchart of FIG. 6 in an interrupting manner at every predetermined interval (for example, every 200 μ seconds).

That is, the microcomputer 11 first detects state quantities (the phase current values Iu, Iv, Iw, the rotation angle θ, the steering torque τ, and the vehicle speed V) at step 201 based on output signals of the sensors. Subsequently, the microcomputer 11 computes the q-axis current command value Iq*, which is a control target of the assist torque generated by the brushless motor 2, and the d-axis current command value Id*(Id*=0) at step 202. Through the d/q transformation, the microcomputer 11 transforms the phase current values Iu, Iv, Iw detected at step 201 into the d-axis current value Id and the q-axis current value Iq (step 203).

Next, the microcomputer 11 differentiates the rotation angle θ with respect to time, that is, divides the difference between the value in the preceding control and the value of the current control by a predetermined cycle, thereby computing the rotation angular velocity ω of the brushless motor 2 (step 204). The microcomputer 11 then determines feedback gains that correspond to the rotation angular velocity ω of the brushless motor 2, that is, determines the values of the d-axis proportionality gain Kdp, the d-axis integration gain Kdi, the q-axis proportionality gain Kqp, and the q-axis integration gain Kqi (step 205). Using the feedback gains determined at step 205, the microcomputer 11 performs feedback control computation (proportionality and integration control) based on the deviation of the d-axis current value Id from the d-axis current command value Id* and the deviation of the q-axis current value Iq from the q-axis current command value Iq*, thereby computing the d-axis voltage command value Vd* and the q-axis voltage command value Vq* (step 206).

Subsequently, through the d/q inverse transformation, the microcomputer 11 transforms the d-axis voltage command value Vd* and the q-axis voltage command value Vq* computed at step 206 into three phase voltage command values Vu*, Vv*, Vw* (step 207). Based on the phase voltage command values Vu*, Vv*, Vw*, the microcomputer 11 generates DUTY instruction values αu, αv, αw of each of the phases (PWM control computation, step 208).

Based on the rotation angular velocity ω computed at step 204, the microcomputer 11 determines the values of dead time compensation amounts βu, βv, βw of each of the phases according to the rotation angular velocity ω (step 209). Using the dead time compensation amounts βu, βv, βw, the microcomputer 11 corrects the DUTY instruction values αu, αv, αw at step 210 (dead time compensation computation, see FIG. 5). Based on the DUTY instruction values αu', αv', αw' computed at step 210, the microcomputer 11 generates a gate ON/OFF signal, and sends the gate ON/OFF signal to the PWM inverter 12 (PWM output, step 211).

According to this embodiment, the following advantages are obtained.

In a software servo control performed by a microcomputer, the output (renewal) of a gate ON/OFF signal is executed in an interrupting manner at every predetermined interval. Therefore, as the rotational speed of the motor is increased, the number of rotation of the motor per one output (renewal) of the gate ON/OFF signal is increased, that is, the motor control is made rougher. As a result, a shift of a current zero cross point until the gate ON/OFF signal is renewed displaces the time at which the dead time compensation is switched. That is, in some cases, the dead time compensation amount βx that should be added to the DUTY instruction value αx is subtracted from the DUTY instruction value αx. Also, in other cases, dead time compensation amount βx that should be subtracted from the DUTY instruction value αx is added to the DUTY instruction value αx. In either case, current distortion is increased.

In this respect, the microcomputer 11 according to this embodiment includes the rotation angular velocity computation section 35, which computes the rotation angular velocity ω of the brushless motor 2, the feedback gain determination section 36, which determines the feedback gains (Kdp, Kdi, Kqp, Kqi) based on the rotation angular velocity ω, and the dead time compensation amount determination section 40, which determines the values of the dead time compensation amounts βu, βv, βw. The greater the absolute value of the rotation angular velocity ω, that is, the higher the rotation speed of the brushless motor 2, the greater the feedback gains determined by the feedback gain determination section 36 become, and the higher the responsivity of the feedback gains becomes. The greater the absolute value of the rotation angular velocity ω, the smaller the values of the dead time compensation amounts βu, βv, βw determined by the dead time compensation amount determination section 40 become.

According to this configuration, when the absolute value of the rotation angular velocity ω of the brushless motor 2 is relatively great, that is, when the brushless motor 2 is rotating at a relatively high speed, making the motor control rougher, the value of the dead time compensation amount βx, which is added to or subtracted from the DUTY instruction value αx, is decreased. Thus, even if the time at which the dead time compensation is switched is displaced, the influence of inversion of addition or subtraction of the dead time compensation amount βx on the switching time of the dead time compensation is reduced. Current distortion due to the reduction of the dead time compensation amount βx is suppressed by an increase of the feedback gains, that is, by the improvement of the responsivity of the feedback control. As in the prior art, the feedback gains for low speed rotation of the brushless motor 2 are set to a low values, so that sound noise and vibration due to current noise are avoided, while current distortion due to dead time is suppressed by addition or subtraction of the dead time compensation amount βx. Therefore, regardless of the rotation speed of the brushless motor 2, the current distortion accompanying the setting of the dead time is accurately compensated for.

The above embodiment may be modified as follows.

In the illustrated embodiment, the greater the absolute value of the rotation angular velocity ω, the smaller the values of the dead time compensation amount βx determined by the dead time compensation amount determination section 40 become. This configuration may be changed. For example, when the absolute value of the rotation angular velocity ω is greater than a predetermined value, the dead time compensation amount βx may be determined to have value less than a value of the case where the absolute value of the rotation angular velocity ω is equal to or less than the predetermined value. In this case, when the value of the dead time compensation amount βx of a case where the absolute value of the rotation angular velocity ω is greater than the predetermined value is zero, that is, when the rotation angular velocity ω is greater than the predetermined value, the dead time compensation with addition or subtraction of the dead time compensation amount βx does not need to be substantially performed. This modification has the same advantages as those of the illustrated embodiment. Particularly, since the value of the dead time compensation amount βx is determined to zero, inversion of addition and subtraction of the dead time compensation amount βx with respect to the DUTY instruction value αx does not generate current distortion. In this case, the predetermined value is preferably set to a value of the rotation angular velocity ω that can cause inversion of addition and subtraction of the dead time compensation amount βx. The value of the rotation angular velocity ω is obtained through experiments and simulations.

The feedback gain determination section 36 according to the illustrated embodiment determines the feedback gains (Kdp, Kdi, Kqp, Kqi), which correspond to the rotation angular velocity ω, based on the gain maps 36a to 36d, and the dead time compensation amount determination section 40 determines the dead time compensation amounts βu, βv, βw based on the compensation amount maps 40a to 40c. However, the feedback gains (Kdp, Kdi, Kqp, Kqi) corresponding to the rotation angular velocity ω and the dead time compensation amounts βu, βv, βw may be determined using a function of the rotation angular velocity ω. Further, in the case where the feedback gains (Kdp, Kdi, Kqp, Kqi)

and the dead time compensation amounts βu, βv, βw are determined through map computations, the configurations of the maps are not limited to those of the gain maps 36a to 36d and the compensation amount maps 40a to 40c. The maps may be configured such that, as the absolute value of the rotation angular velocity ω increases, the dead time compensation amount is monotonously decreases or the feedback gains monotonously increase.

Further, the proportionality gain and the integration gain do not necessarily increase together as the absolute value of the rotation angular velocity ω increases. It is sufficient if at least one of the proportionality gain and the integration gain increases. One of the proportionality gain and the integration gain may decrease as long as the responsivity of the feedback control is eventually improved.

Therefore, the present examples and embodiments are to be considered as illustrative and not restrictive and the invention is not to be limited to the details given herein, but may be modified within the scope and equivalence of the appended claims.

The invention claimed is:

1. A motor controller comprising a DUTY instruction value generation section, a PWM output section, and a PWM inverter, the DUTY instruction value generation section generating a DUTY instruction value through a feedback control based on a deviation of an actual current value from a current command value, the PWM output section outputting a gate ON/OFF signal according to comparison between the DUTY instruction value and a carrier wave, the PWM inverter being formed of a plurality of switching element circuits connected in parallel, each switching element circuit being formed of a pair of switching elements connected in series, wherein, when each switching element is turned on and off based on the gate ON/OFF signal, the PWM inverter converts a direct-current power supply to three-phase drive power, and supplies the three-phase drive power to a brushless motor, wherein dead time is set to prevent arm short circuits due to ON/OFF switching of each switching element, and wherein the gate ON/OFF signal is renewed at every predetermined cycle, the motor controller, further comprising:
a current direction determination section that determines the direction of current of each phase;
a rotation angular velocity computation section that computes a rotation angular velocity of the brushless motor;
a compensation amount determination section that determines a compensation amount for correcting the DUTY instruction value based on the rotation angular velocity, wherein the greater the absolute value of the rotation angular velocity, the smaller the compensation amount determined by the compensation amount determination section becomes,
a dead time compensation section that selectively adds the compensation amount to and subtracts the compensation amount from the DUTY instruction value according to the current direction of each phase; and
a gain determination section that determines a feedback gain of the feedback control based on the rotation angular velocity, wherein the gain determination section changes the feedback gain such that the greater the absolute value of the rotation angular velocity, the higher the responsivity of the feedback control becomes.

2. The motor controller according to claim 1, wherein the DUTY instruction value generation section includes a d/q transformation section, a feedback control section, a d/q inverse transformation section, and a PWM computation section,
wherein the d/q transformation section transforms three phase current values into a d-axis current value and a q-axis current value of a d/q coordinate system,
wherein the feedback control section performs a feedback control based on deviation of the d-axis current value and the q-axis current value from a d-axis current command value and a q-axis current command value, thereby computing a d-axis voltage command value and a q-axis voltage command value,
wherein the d/q inverse transformation section transforms the d-axis voltage command value and the q-axis voltage command value into three phase voltage command values,
wherein the PWM computation section computes a DUTY instruction value based on the phase voltage command values, and
wherein the gain determination section determines, as feedback gains, a proportionality gain and an integration gain each corresponding to one of the d-axis and the q-axis.

3. A motor controller comprising a DUTY instruction value generation section, a PWM output section, and a PWM inverter, the DUTY instruction value generation section generating a DUTY instruction value through a feedback control based on a deviation of an actual current value from a current command value, the PWM output section outputting a gate ON/OFF signal according to comparison between the DUTY instruction value and a carrier wave, the PWM inverter being formed of a plurality of switching element circuits connected in parallel, each switching element circuit being formed of a pair of switching elements connected in series, wherein, when each switching element is turned on and off based on the gate ON/OFF signal, the PWM inverter converts a direct-current power supply to three-phase drive power, and supplies the three-phase drive power to a brushless motor, wherein dead time is set to prevent arm short circuits due to ON/OFF switching of each switching element, and wherein the gate ON/OFF signal is renewed at every predetermined cycle, the motor controller, further comprising:
a current direction determination section that determines the direction of current of each phase;
a rotation angular velocity computation section that computes a rotation angular velocity of the brushless motor;
a compensation amount determination section that determines a compensation amount for correcting the DUTY instruction value based on the rotation angular velocity, wherein the greater the absolute value of the rotation angular velocity, the smaller the compensation amount determined by the compensation amount determination section become;
a dead time compensation section that selectively adds the compensation amount to and subtracts the compensation amount from the DUTY instruction value according to the current direction of each phase; and
a gain determination section that determines a feedback gain of the feedback control based on the rotation angular velocity, wherein the greater the absolute value of the rotation angular velocity, the greater the value of the feedback gain determined by the gain determination section becomes.

4. The motor controller according to claim 3, wherein the DUTY instruction value generation section includes a d/q transformation section, a feedback control section, a d/q inverse transformation section, and a PWM computation section,
  wherein the d/q transformation section transforms three phase current values into a d-axis current value and a q-axis current value of a d/q coordinate system;
  wherein the feedback control section performs a feedback control based on deviation of the d-axis current value and the q-axis current value from a d-axis current command value and a q-axis current command value, thereby computing a d-axis voltage command value and a q-axis voltage command value,
  wherein the d/q inverse transformation section transforms the d-axis voltage command value and the q-axis voltage command value into three phase voltage command values,
  wherein the PWM computation section computes a DUTY instruction value based on the phase voltage command values, and
  wherein the gain determination section determines, as feedback gains, a proportionality gain and an integration gain each corresponding to one of the d-axis and the q-axis.

5. A motor controller comprising a DUTY instruction value generation section, a PWM output section, and a PWM inverter, the DUTY instruction value generation section generating a DUTY instruction value through a feedback control based on a deviation of an actual current value from a current command value, the PWM output section outputting a gate ON/OFF signal according to comparison between the DUTY instruction value and a carrier wave, the PWM inverter being formed of a plurality of switching element circuits connected in parallel, each switching element circuit being formed of a pair of switching elements connected in series, wherein, when each switching element is turned on and off based on the gate ON/OFF signal, the PWM inverter converts a direct-current power supply to three-phase drive power, and supplies the three-phase drive power to a brushless motor, wherein dead time is set to prevent arm short circuits due to ON/OFF switching of each switching element, and wherein the gate ON/OFF signal is renewed at every predetermined cycle, the motor controller, further comprising:
  a current direction determination section that determines the direction of current of each phase;
  a rotation angular velocity computation section that computes a rotation angular velocity of the brushless motor;
  a compensation amount determination section that determines a compensation amount for correcting the DUTY instruction value based on the rotation angular velocity, wherein, when the absolute value of the rotation angular velocity is greater than a predetermined value, the compensation amount determination section determines the compensation amount such that the compensation amount is smaller than the compensation amount in a case where the absolute value of the rotational angular velocity is less than the predetermined value;
  a dead time compensation section that selectively adds the compensation amount to and subtracts the compensation amount from the DUTY instruction value according to the current direction of each phase; and
  a gain determination section that determines a feedback gain of the feedback control based on the rotation angular velocity, wherein the greater the absolute value of the rotation angular velocity, the greater the value of the feedback gain determined by the gain determination section becomes.

6. The motor controller according to claim 5, wherein the compensation amount determination section determines the compensation amount such that the compensation amount is zero when the absolute value of the rotational angular velocity is greater than the predetermined value.

7. The motor controller according to claim 5, wherein the DUTY instruction value generation section includes a d/q transformation section, a feedback control section, a d/q inverse transformation section, and a PWM computation section,
  wherein the d/q transformation section transforms three phase current values into a d-axis current value and a q-axis current value of a d/q coordinate system,
  wherein the feedback control section performs a feedback control based on deviation of the d-axis current value and the q-axis current value from a d-axis current command value and a q-axis current command value, thereby computing a d-axis voltage command value and a q-axis voltage command value,
  wherein the d/q inverse transformation section transforms the d-axis voltage command value and the q-axis voltage command value into three phase voltage command values,
  wherein the PWM computation section computes a DUTY instruction value based on the phase voltage command values, and
  wherein the gain determination section determines, as feedback gains, a proportionality gain and an integration gain each corresponding to one of the d-axis and the q-axis.

8. An electric power steering apparatus having a motor controller, wherein the motor controller includes:
  a DUTY instruction value generation section that generates a DUTY instruction value through a feedback control based on a deviation of an actual current value from a current command value;
  a PWM output section that outputs a gate ON/OFF signal according to comparison between the DUTY instruction value and a carrier wave;
  a PWM inverter that is formed of a plurality of switching element circuits connected in parallel, each switching element circuit being formed of a pair of switching elements connected in series, wherein, when each switching element is turned on and off based on the gate ON/OFF signal, the PWM inverter converts a direct-current power supply to three-phase drive power, and supplies the three-phase drive power to a brushless motor;
  wherein dead time is set to prevent arm short circuits due to ON/OFF switching of each switching element,
  wherein the gate ON/OFF signal is renewed at every predetermined,cycle,
  a current direction determination section that determines the direction of current of each phase;
  a rotation angular velocity computation section that computes a rotation angular velocity of the brushless motor;
  a compensation amount determination section that determines a compensation amount for correcting the DUTY instruction value based on the rotation angular velocity, wherein the greater the absolute value of the rotation angular velocity, the smaller the compensation amount determined by the compensation amount determination section become;
  a dead time compensation section that selectively adds the compensation amount to and subtracts the compensation amount from the DUTY instruction value according to the current direction of each phase; and a gain determination section that determines a feedback gain of the feedback control based on the rotation angular velocity, wherein the gain determination section changes the feedback gain such that the greater the absolute value of the rotation angular velocity, the higher the responsivity of the feedback control becomes.

9. The electric power steering apparatus according to claim 8, wherein the DUTY instruction value generation section includes a d/q transformation section, a feedback control section, a d/q inverse transformation section, and a PWM computation section, wherein the d/q transformation section transforms three phase current values into a d-axis current value and a q-axis current value of a d/q coordinate system, wherein the feedback control section performs a feedback control based on deviation of the d-axis current value and the q-axis current value from a d-axis current command value and a q-axis current command value, thereby computing a d-axis voltage command value and a q-axis voltage command value, wherein the d/q inverse transformation section transforms the d-axis voltage command value and the q-axis voltage command value into three phase voltage command values, wherein the PWM computation section computes a DUTY instruction value based on the phase voltage command values, and wherein the gain determination section determines, as feedback gains, a proportionality gain and an integration gain each corresponding to one of the d-axis and the q-axis.

10. An electric power steering apparatus having a motor controller, wherein the motor controller includes:

a DUTY instruction value generation section that generates a DUTY instruction value through a feedback control based on a deviation of an actual current value from a current command value;

a PWM output section that outputs a gate ON/OFF signal according to comparison between the DUTY instruction value and a carrier wave;

a PWM inverter that is formed of a plurality of switching element circuits connected in parallel, each switching element circuit being formed of a pair of switching elements connected in series, wherein, when each switching element is turned on and off based on the gate ON/OFF signal, the PWM inverter converts a direct-current power supply to three-phase drive power, and supplies the three-phase drive power to a brushless motor;

wherein dead time is set to prevent arm short circuits due to ON/OFF switching of each switching element, wherein the gate ON/OFF signal is renewed at every predetermined cycle, a current direction determination section that determines the direction of current of each phase;

a rotation angular velocity computation section that computes a rotation angular velocity of the brushless motor;

a compensation amount determination section that determines a compensation amount for correcting the DUTY instruction value based on the rotation angular velocity, wherein the greater the absolute value of the rotation angular velocity, the smaller the compensation amount determined by the compensation amount determination section become;

a dead time compensation section that selectively adds the compensation amount to and subtracts the compensation amount from the DUTY instruction value according to the current direction of each phase; and a gain determination section that determines a feedback gain of the feedback control based on the rotation angular velocity, wherein the greater the absolute value of the rotation angular velocity, the greater the value of the feedback gain determined by the gain determination section becomes.

11. The electric power steering apparatus according to claim 10, wherein the DUTY instruction value generation section includes a d/q transformation section, a feedback control section, a d/q inverse transformation section, and a PWM computation section, wherein the d/q transformation section transforms three phase current values into a d-axis current value and a q-axis current value of a d/q coordinate system, wherein the feedback control section performs a feedback control based on deviation of the d-axis current value and the q-axis current value from a d-axis current command value and a q-axis current command value, thereby computing a d-axis voltage command value and a q-axis voltage command value, wherein the d/q inverse transformation section transforms the d-axis voltage command value and the q-axis voltage command value into three phase voltage command values, wherein the PWM computation section computes a DUTY instruction value based on the phase voltage command values, and wherein the gain determination section determines, as feedback gains, a proportionality gain and an integration gain each corresponding to one of the d-axis and the q-axis.

12. An electric power steering apparatus having a motor controller, wherein the motor controller includes:

a DUTY instruction value generation section that generates a DUTY instruction value through a feedback control based on a deviation of an actual current value from a current command value;

a PWM output section that outputs a gate ON/OFF signal according to comparison between the DUTY instruction value and a carrier wave;

a PWM inverter that is formed of a plurality of switching element circuits connected in parallel, each switching element circuit being formed of a pair of switching elements connected in series, wherein, when each switching element is turned on and off based on the gate ON/OFF signal, the PWM inverter converts a direct-current power supply to three-phase drive power, and supplies the three-phase drive power to a brushless motor;

wherein dead time is set to prevent arm short circuits due to ON/OFF switching of each switching element, wherein the gate ON/OFF signal is renewed at every predetermined cycle, a current direction determination section that determines the direction of current of each phase;

a rotation angular velocity computation section that computes a rotation angular velocity of the brushless motor;

a compensation amount determination section that determines a compensation amount for correcting the DUTY instruction value based on the rotation angular velocity, wherein, when the absolute value of the rotation angular velocity is greater than a predetermined value, the compensation amount determination section determines the compensation amount such that the compensation amount is smaller than the compensation amount in a case where the absolute value of the rotational angular velocity is less than the predetermined value;

a dead time compensation section that selectively adds the compensation amount to and subtracts the compensation amount from the DUTY instruction value according to the current direction of each phase; and a gain determination section that determines a feedback gain of the feedback control based on the rotation angular velocity, wherein the greater the absolute value of the rotation angular velocity, the greater the value of the feedback gain determined by the gain determination section becomes.

13. The electric power steering apparatus according to claim 12, wherein the compensation amount determination section determines the compensation amount such that the compensation amount is zero when the absolute value of the rotational angular velocity is greater than the predetermined value.

14. The electric power steering apparatus according to claim 12, wherein the DUTY instruction value generation section includes a d/q transformation section, a feedback control section, a d/q inverse transformation section, and a PWM computation section, wherein the d/q transformation section transforms three phase current values into a d-axis current value and a q-axis current value of a d/q coordinate system, wherein the feedback control section performs a feedback control based on deviation of the d-axis current value and the q-axis current value from a d-axis current command value and a q-axis current command value, thereby computing a d-axis voltage command value and a q-axis voltage command value, wherein the d/q inverse transformation section transforms the d-axis voltage command value and the q-axis voltage command value into three phase voltage command values, wherein the PWM computation section computes a DUTY instruction value based on the phase voltage command values, and wherein the gain determination section determines, as feedback gains, a proportionality gain and an integration gain each corresponding to one of the d-axis and the q-axis.

* * * * *